United States

Sessler et al.

[11] 3,867,836
[45] Feb. 25, 1975

[54] CRACK DETECTION APPARATUS AND METHOD

[75] Inventors: John G. Sessler; Volker Weiss, both of Syracuse, N.Y.

[73] Assignee: The United States of America as represented by the Secretary of the Navy, Washington, D.C.

[22] Filed: Mar. 26, 1973

[21] Appl. No.: 345,164

[52] U.S. Cl. .............................................. 73/67.5 R
[51] Int. Cl. ........................................... G01n 29/04
[58] Field of Search .............. 73/67.5 R, 67.6, 67.7, 73/67.9, 67.8 R, 67.8 S, 70, 71.5 R, 71.5 US, 69

[56] References Cited
UNITED STATES PATENTS

| | | | |
|---|---|---|---|
| 2,514,080 | 7/1950 | Mason | 73/71.5 U |
| 3,250,120 | 5/1966 | Dickinson | 73/67.6 |
| 3,436,958 | 4/1969 | Proctor | 73/67.9 X |
| 3,529,465 | 9/1970 | Kleesattel et al. | 73/67.7 X |
| 3,540,267 | 11/1970 | Wood | 73/67.8 S |

*Primary Examiner*—Richard C. Queisser
*Assistant Examiner*—Stephen A. Kreitman
*Attorney, Agent, or Firm*—Richard S. Sciascia; Arthur A. McGill; Prithvi C. Lall

[57] ABSTRACT

An apparatus and method for non-destructively detecting the presence and the location of crack in materials utilizing low frequency mechanical vibrations. The material specimen or structure having a crack to be detected is subjected to tensile or compressive forces due to excitation caused by low frequency sound waves or mechanical vibrations from a generator, thus changing the opening and thereby changing the effective size of the crack in the specimen. An ultrasonic search unit is used to follow modulations of reflected energy at the crack interface due to variations of the effective size of the crack. The search unit is controlled by an ultrasonic pulser-receiver which displays the amplitude of echo from the crack on an oscilloscope.

6 Claims, 3 Drawing Figures

PATENTED FEB 25 1975     3,867,836
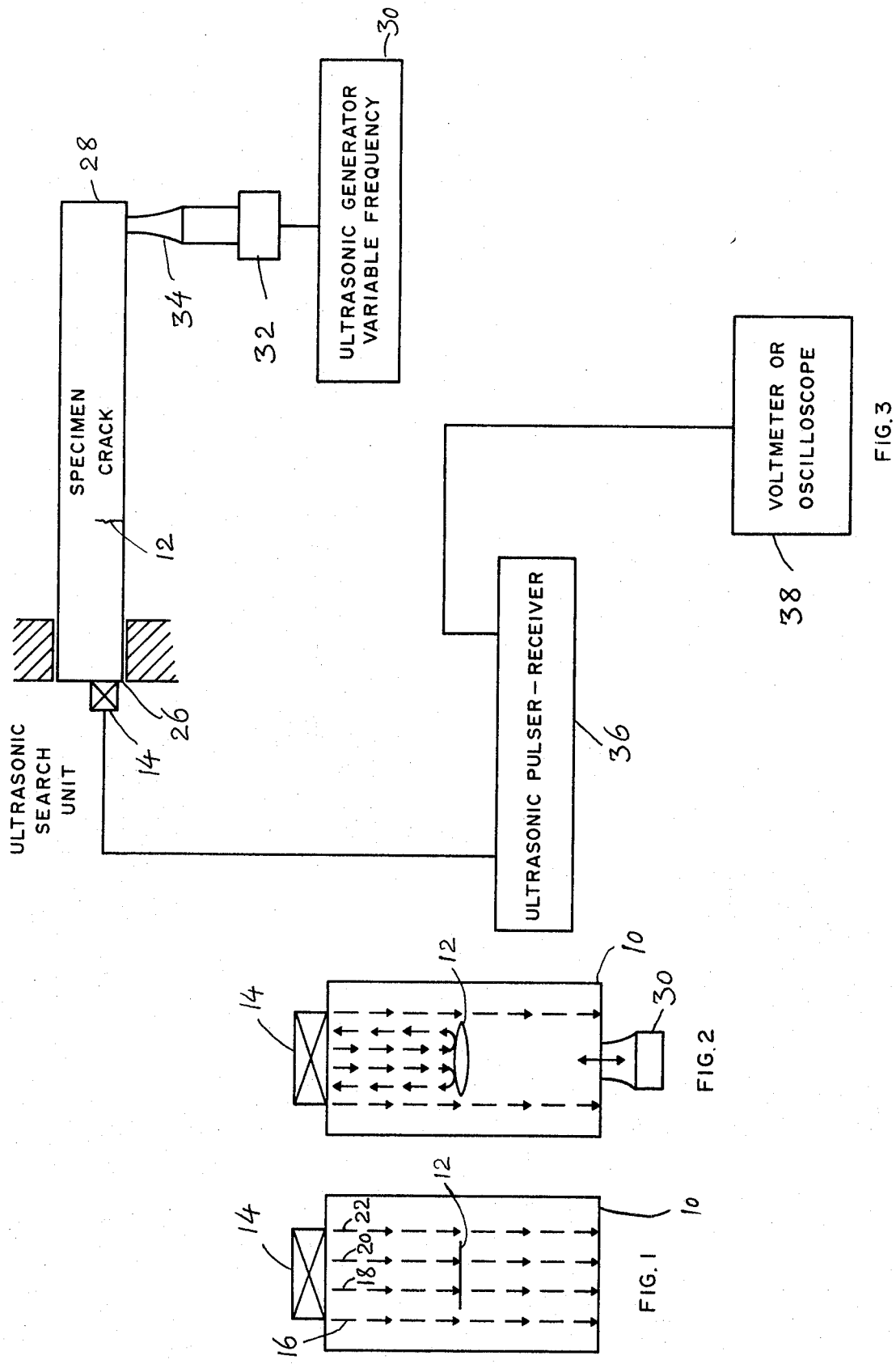

CRACK DETECTION APPARATUS AND METHOD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to crack detection in materials and more particularly to an improved method and apparatus for detecting cracks using low frequency sound waves and ultrasonics.

Ultrasonic energy has been used in crack detection in materials. A number of successful techniques have been developed. However, a satisfactory method of detecting ultra-thin cracks in specimens has not been found. Such cracks have been either not detected at all or have led to the conclusions that such cracks are of insignificant importance.

Through the development of fracture mechanics, it is now possible to calculate the critical defects, i.e., fatigue cracks etc. which will cause the material to fail. Thus, if the size of the defects present and their positions in a material structure are precisely known, it is possible to get quantitative information about the reliability of the material structure. This obviously implies that it is absolutely essential to locate, identify and measure very accurately the defects present in a given structure in order to make a reliable prediction about its performance using fracture mechanics analysis.

Ultrasonic pulse-echo technique is one of the most popular of the non-destructive testing methods used for finding defects and discontinuities present in a material. However, the test specimen normally employed in calibrating ultrasonic pulse-echo equipment usually contains cylindrical holes, saw cuts or machined notches, but not natural cracks such as fatigue cracks. Since such natural cracks are of the most dangerous type of flaw, it is important that the limitations of the pulse-echo technique to detect such cracks be more clearly defined. Thus, it is desirable to devise a satisfactory means of detecting ultra-thin cracks in materials.

SUMMARY OF THE INVENTION

The object and advantages of the present invention are accomplished by utilizing an ultrasonic pulse-echo technique for non-destructively detecting ultra-thin cracks in the materials with simultaneous low frequency excitation of the material specimen or structural element. The apparatus used in this invention comprises a variable frequency ultrasonic generator, a crystal oscillator which is excited by the ultrasonic generator, and a metallic horn which is coupled to the material specimen at one end thereof. The material specimen is cantilevered at the other end and an ultrasonic search unit, controlled by an ultrasonic pulser-receiver, is used to find variations in energy reflected at the interface of the crack in the material specimen with the changes in the effective size of the crack resulting from low frequency excitation of the specimen by the ultrasonic generator. Variations in the amplitude of echo produced at the crack interface are displayed on an oscilloscope.

One object of this invention is to determine very thin fatigue cracks in a material.

Another object of this invention is to vary the effective size of a crack in a material specimen by subjecting it to tensile and compressive forces by means of a low frequency ultrasonic generator.

Still another object of this invention is to use an ultrasonic search unit which sends its energy towards a crack interface in a material specimen where a reflection of energy transmitted by the ultrasonic search unit takes place.

Still another object of this invention is to use an improved method of crack detection using a combination of ultrasonic search unit and an ultrasonic pulser-receiver unit.

Still another object of this invention is to use an ultrasonic pulse-echo method of determining small cracks in materials by studying changes in reflected energy due to variations of the effective size of a crack.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a diagrammatic representation of a material specimen wherein energy from an ultrasonic search unit is transmitted through the position of a crack in the material specimen or structure;

FIG. 2 is a diagrammatic representation of a material specimen wherein a crack is opened up because of a force applied on one end of the specimen while such energy is applied; and FIG. 3 is a block diagram of a preferred embodiment of the ultrasonic pulse-echo technique apparatus of the invention.

DESCRIPTION OF A PREFERRED EMBODIMENT

Referring to the drawings wherein like reference characters designate identical or corresponding parts throughout, and more particularly to FIG. 1 thereof, a material specimen or structure 10 having a thin crack 12 located somewhere near the middle of the specimen, is shown. An ultrasonic search unit 14 sends out energy pulses which travel through the material specimen 10 as shown by dashed lines 16, 18, 20 and 22. It can be seen that the energy traveling through the material specimen passes through the specimen without any reflection at the position where the crack 12 is located in the material specimen, i.e., no echo is generated at the crack interface, because the crack is closed and no impedance mismatch exists at the crack boundary.

FIG. 2 diagrammatically shows the condition wherein the effective size of crack 12 is changed by applying tensile and compressive forces at end 28 of the specimen 10 by means of an ultrasonic generator 30. As shown in FIG. 2, part of the energy transmitted through the specimen 10 by ultrasonic search unit 14 is reflected at the interface of the crack, thus producing an echo. The amplitude of the echo produced at the position of crack 12 is determined by the crack opening which creates a new effective size of the crack 12.

FIG. 3 shows the apparatus used in the improved method of crack detection of the invention. Material specimen or structure 10 is cantilevered at its end 26 and free to move on its opposite end 28. Ultrasonic generator 30 is used to produce vibrations of frequencies in the range of 10 to 20 kilo Hertz, hereinafter called kHz. Ultrasonic generator 30 is a conventional unit which has sufficient power output to apply strong enough tensile and compressive forces on end 28 of the material specimen 10 in a direction normal to the plane of the crack 12 for causing changes in the effective size of crack 12. As an example, a Branson Model J17V Power Supply can be used. The output of ultrasonic generator 30 drives a sonic converter transducer 32 such as a lead zirconate titanate piezoelectric crystal. Transducer 32 is coupled to a tuned exponential horn 34 which is in turn coupled to the material specimen 10 near end 28 thereof. The system including ultrasonic generator 30, transducer 32, and tuned horn 34 is preferably rated to give a mechanical output of 1,700 inch-lbs. per second at the horn tip and will vibrate under loads up to about 100 lbs. (It should be clearly understood that any other similar arrangement for exciting the material specimen or structure 10 can also be used without deviating from the spirit of the invention. As an example, a MB magnetostrictive vibration unit with the variable frequency range from 2 Hertz to 70 kHz can also be used. Such a system has sufficient output to drive the transducer and can attain the maximum force of 10 lbs. Alternatively, a Hewlett-Packard generator of variable frequency up to 20 kHz in combination with a magnetic type shaker comprising a magnetic coil and a soft core can also be used.) Variations in the force applied near end 28 of material specimen or structure 10 causes corresponding changes in the effective size of thin crack 12 in material specimen or structure 10. The rate at which such changes in the effective size of crack 12 take place upon excitation by generator 30 is the same as the frequency of the ultrasonic generator 30. One suitable frequency was found to be 10 kHz. However, other suitable frequencies, e.g., 20 kHz, can also be used.

A standard search unit was used at end 26 of the material structure 10. Frequencies of 2.5, 5.0, and 10.0 mega Hertz, hereinafter called MHz, were used. However, other suitable frequencies for the ultrasonic search unit can also be used without deviating from the spirit of the invention. The output of the ultrasonic search unit 14 is fed into the materials specimen or structure 10 and part of this energy output of the ultrasonic search unit 14 is reflected at the position of crack 12. The amount of reflected energy at the position of the crack depends upon the size and opening of the crack at the time of reflection. This reflected energy is received by the ultrasonic search unit 14 in the form of an echo. The operation of the ultrasonic search unit 14 is controlled by a standard ultrasonic pulser-receiver unit 36, such as SPERRY UM 721 Reflectoscope. Alternatively, any other suitable ultrasonic pulser-receiver unit can be used. The duration during which ultrasonic search unit 14 transmits energy and receives energy is controlled by ultrasonic pulser-receiver 36. The output of ultrasonic pulser-receiver unit 36, which is a function of the echo received, is measured by a voltmeter or displayed on an oscilloscope designated by numeral 38.

OPERATION OF THE APPARATUS

The material specimen or structure 10 is positioned as shown in FIG. 3, i.e., cantilevered at its end 26 and free to move at its end 28. The material specimen or structure 10 is excited by vibrations from ultrasonic generator 30, transducer 32 and horn 34 combination. Vibrations at end 28 of the material specimen 10 take place at a frequency determined by the frequency of ultrasonic generator 30. These vibrations result in tensile and compressive forces applied at end 28 and cause corresponding changes in the effective size of the crack 12 in material specimen 10. As an example, it can be assumed that the changes in the effective size of the crack are taking place at a frequency of 10 kHz, and the ultrasonic search unit 14 is transmitting energy into the material specimen 10 at 5 MHz, and ultrasonic pulser-receiver 36 is set for a repetition rate of 1 kHz. The repetition rate of 1 kHz set by ultrasonic pulser-receiver 36 makes ultrasonic search unit 14 transmit energy into the material specimen 10 for a fraction of a millisecond and receive the reflected energy from the position of the crack for the remaining part of 1 millisecond which in turn is received by ultrasonic pulser-receiver 36. The reflected energy as received by an ultrasonic pulser-receiver 36 thus forms an echo. The amplitude of the echo formed is determined by the size and opening of crack 12 at the time an output energy pulse of the search unit 14 was reflected at the interface of the crack 12. A voltage signal proportional to the amplitude of the echo is transmitted by ultrasonic pulser-receiver 36 which is either measured by a standard voltmeter or displayed on an oscilloscope represented by block 38. As pointed out earlier, if the rate at which the size of the crack is changing is 10 kHz and the repetition rate as controlled by the ultrasonic pulser-receiver 36 is 1 kHz, the echo as measured by the voltmeter or displayed on the oscilloscope will be constant, ranging between and including maximum and minimum intensity values. However, if the repetition rate is slightly changed from 1 kHz so as to detune the system, i.e., ultrasonic generator frequency is not a whole multiple of repetition frequencies, the voltage signal either measured on the voltmeter or displayed on the oscilloscope will go through maxima and minima, which in turn indicates variations in the amplitude of the echo at the position of the crack. From the voltmeter readings and the oscilloscope display it is then possible to determined the position and the size of the crack 12 in the material specimen 10.

Thus, a material specimen or a structure having a crack is excited at one end by a low frequency ultrasonic generator while the other end of the material specimen is fixed. The vibrations caused at the free end of the specimen result in tensile and compressive forces in the specimen and cause changes in the effective size of the crack in the material specimen. An ultrasonic search unit together with an ultrasonic pulser-receiver is used to find the amplitude of the echo formed due to reflection at the position of the crack. The amplitude of the echo is then measured either by a voltmeter or an oscilloscope and the position and size of the crack in the material specimen is then determined.

Obviously many modifications and variations of the present invention are possible in the light of above teachings. As an example, it is possible to use a repetition rate trigger arrangement to synchronize the repetition rate and the rate at which the effective size of the specimen crack changes. Furthermore, it is possible to cause variations in the effective size and opening of the crack by another suitable method without deviating from the essence of this invention. It is therefore understood that within the scope of the appended claims the invention may be practiced otherwise than as specifically described.

We claim:

1. An apparatus for non-destructively detecting cracks comprising:
an elongated specimen having a first end and a second end, said elongated specimen being cantilevered at the second end thereof;
a first source means for generating sound waves at a first frequency;
means for coupling the sound waves from said first source to the first end of said elongated specimen;
a second source means for generating electrical pulses at a second frequency, said second frequency being significantly higher than said first frequency, said second source means being proximate the second end of said elongated specimen;
means for adjustably pulsing said second source means for transmitting said electrical pulses at said second frequency at the second end through said elongated specimen;
means for detecting electrical pulses of said second frequency reflected at a crack's position in said specimen and thus forming an echo; and
means for displaying said echo.

2. The apparatus of claim 1 wherein said first source means for generating sound waves at said first frequency further comprises:
a pulse generator;
a transducer coupled to said pulse generator; and
a horn coupling said transducer and said first end of said elongated specimen.

3. The apparatus of claim 1 wherein said second source means is a contact ultrasonic search unit for transmitting electrical pulses of said second frequency through said specimen and for receiving electrical pulses of said second frequency reflected at the crack's position in said specimen.

4. The apparatus of claim 1 wherein said means for transmitting electrical pulses of said second frequency and receiving electrical pulses of said second frequency reflected at the crack's interface includes an ultrasonic pulser-receiver.

5. The apparatus of claim 4 wherein said means for displaying said echo comprises an oscilloscope.

6. The apparatus of claim 1 wherein said first source means includes a magnetic coil and a soft core.

* * * * *